US010115138B1

(12) United States Patent
Streets et al.

(10) Patent No.: US 10,115,138 B1
(45) Date of Patent: Oct. 30, 2018

(54) FREIGHT QUOTING PROCESS

(71) Applicants: Dahbry Ling Streets, San Gabriel, CA (US); Susan Pui Yee Ling, San Gabriel, CA (US)

(72) Inventors: Dahbry Ling Streets, San Gabriel, CA (US); Susan Pui Yee Ling, San Gabriel, CA (US)

(*) Notice: Subject to any disclaimer, the term of this patent is extended or adjusted under 35 U.S.C. 154(b) by 580 days.

(21) Appl. No.: 14/594,025

(22) Filed: Jan. 9, 2015

(51) Int. Cl.
*G06Q 30/00* (2012.01)
*G06Q 30/06* (2012.01)

(52) U.S. Cl.
CPC ..... *G06Q 30/0611* (2013.01); *G06Q 30/0641* (2013.01)

(58) Field of Classification Search
None
See application file for complete search history.

(56) References Cited

U.S. PATENT DOCUMENTS

| 7,792,734 | B1* | 9/2010 | Burns | G06Q 30/0633 |
| | | | | 705/26.8 |
| 2003/0069836 | A1* | 4/2003 | Penney | G06Q 40/00 |
| | | | | 705/37 |
| 2003/0182171 | A1* | 9/2003 | Vianello | G06Q 10/063112 |
| | | | | 705/7.14 |
| 2009/0327105 | A1* | 12/2009 | Moussa | G06Q 10/08 |
| | | | | 705/29 |
| 2010/0114790 | A1* | 5/2010 | Strimling | G06Q 10/083 |
| | | | | 705/330 |
| 2015/0371183 | A1* | 12/2015 | Anderson | G06Q 10/0833 |
| | | | | 705/333 |
| 2017/0024827 | A1* | 1/2017 | McGill | G06Q 40/08 |

OTHER PUBLICATIONS

Rodríguez-Aguilar, J. A., et al. "Enabling assisted strategic negotiations in actual-world procurement scenarios." to appear into Electronic Commerce Research journal (2005).*

* cited by examiner

*Primary Examiner* — Marissa Thein
*Assistant Examiner* — Michelle T Kringen
(74) *Attorney, Agent, or Firm* — Plager Schack LLP; Mark H. Plager; Stephen Hallberg

(57) ABSTRACT

Freight quoting processes for obtaining a freight quote and informing a freight company about customer satisfaction related to a quoted price for a customer-selected freight delivery are disclosed. At least one freight quoting process includes (i) receiving a set of user credentials for accessing a customer account, (ii) receiving a request for a freight quote, (iii) transmitting a freight quote to a confirmed communication account of the customer, and (iv) receiving a selection of a decision among several possible decisions associated with the freight quote item. The several possible decisions include a decision to accept the freight quote, a decision to decline the freight quote, a decision to request a re-quote of the freight quote, and a decision to make payment for the freight quote from an existing account. The freight quoting process further includes transmitting a re-quoted freight price to the customer.

9 Claims, 3 Drawing Sheets

FREIGHT QUOTING PROCESS

BACKGROUND

The process for freight quoting and acceptance of freight quotes, is typically a manual process in which freight quotes are requested by a customer who telephones or emails a freight company for a quote. Then a freight quote is subsequently telephoned or emailed back by a person associated with the freight company. If there is direct telephonic communication, the customer may accept or decline the freight quote right then and there. However, many times there is a missed call or the freight quote was emailed to the customer. In these cases, the customer must later contact the freight company to either accept or decline the quoted price. Also, some customers may provisionally decline the currently offered quote, but ask for better pricing (e.g., a better quote). If the customer requests a new quote, the freight company may issue a new quote on better terms for the customer, if better terms are feasible by the freight company. If not, normally the freight company simply informs the customer that better terms cannot be offered, but that the customer may still be able to "Accept" or "Decline" the original quote. This is an existing process of quoting and re-quoting that is cumbersome, temporally disjoint, and often prone to error. The process is therefore problematic for freight companies that need to maintain existing business processes without using traditional delay-based email and/or phone quoting.

Therefore, what is needed is an automated process for allowing customers to inform a freight company whether or not they are satisfied with the quoted price from the freight company.

BRIEF SUMMARY

Some embodiments of the invention include novel freight quoting processes for obtaining a freight quote for delivery of a freight quote item and automatically informing a freight company about a customer satisfaction level related to a quoted price for a customer-selected freight delivery. In some embodiments, the freight quoting processes include a freight company quoting process and a freight customer quoting process.

In some embodiments, the freight company quoting process (i) receives a set of user credentials for accessing a customer account, (ii) receives a request for a freight quote, (iii) transmits a freight quote to a confirmed communication account of the customer, and (iv) receives a selection of a decision from a plurality of decisions associated with the freight quote item. The freight company quoting process can be performed in relation to a registered user associated with an existing customer account or a non-registered or partially-registered user not associated with an existing customer account.

In some embodiments, the plurality of decisions comprises a decision to accept the freight quote, a decision to decline the freight quote, and a decision to request a re-quote of the freight quote. In some embodiments, the freight quoting process further comprises transmitting a re-quoted freight price to the confirmed communication account of the customer. In some embodiments, the confirmed communication account of the customer is at least one of an email address, an SMS number, and a telephone number. In some embodiments, the freight company quoting process is performed by a freight company quoting program that runs on a computing device that is connected to a network.

In some embodiments, the freight customer quoting process (i) receives a set of user inputs for accessing a customer account associated with a freight company, (ii) transmits the set of user inputs to log into the customer account, (iii) transmits a set of freight quote request inputs of the user in order to obtain a quote from the freight company, (iv) receives a notification informing the user to retrieve a quote from a confirmed communication account of the user, and (v) transmits a user-selected decision associated with the quote to the freight company. The freight customer quoting process can be performed in relation to a registered user associated with an existing customer account or a non-registered or partially-registered user not associated with an existing customer account. In some embodiments, the freight customer quoting process is performed by freight customer quoting program that runs on a computing device that is connected to the network.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
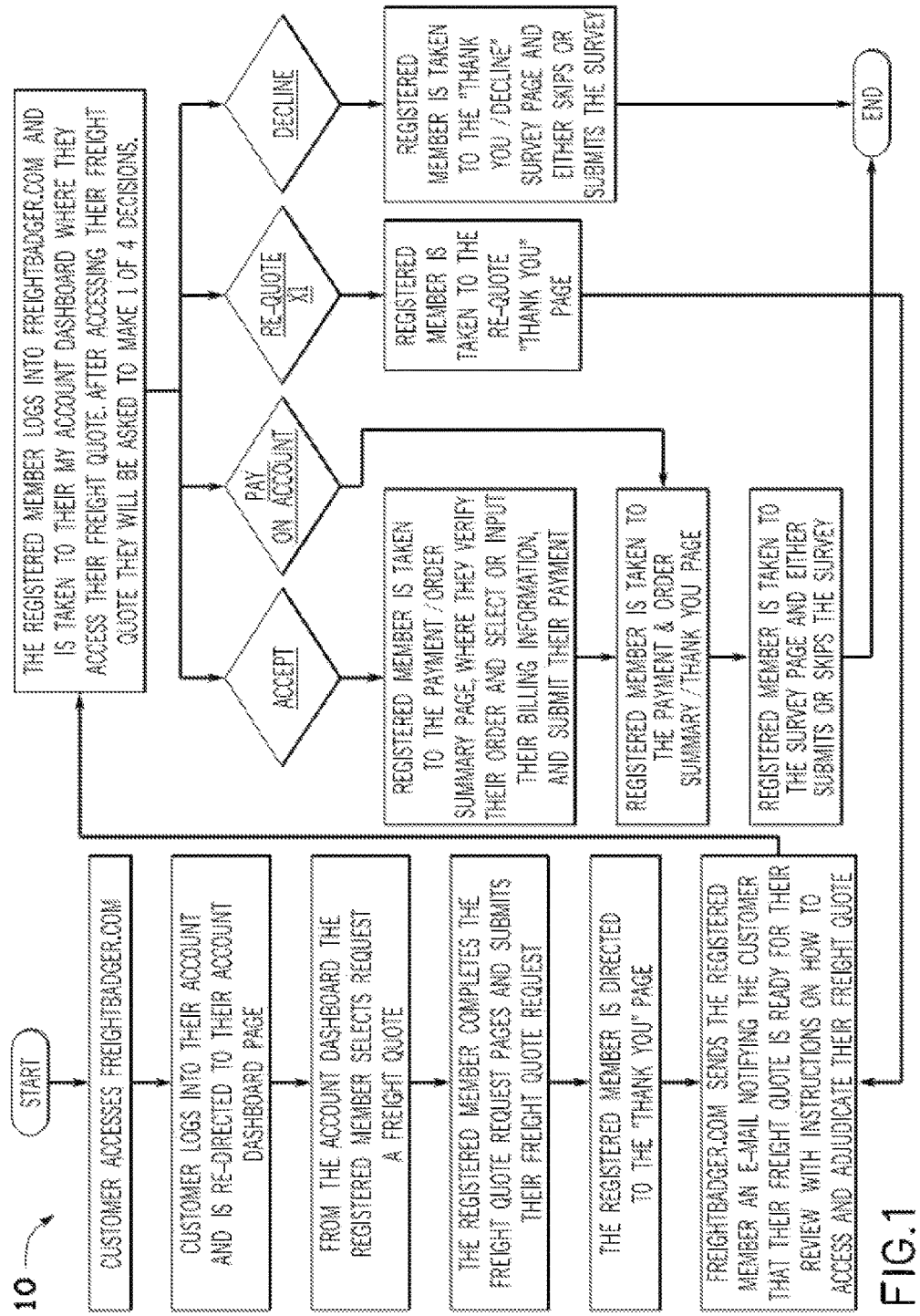

Having thus described the invention in general terms, reference is now made to the accompanying drawings, which are not necessarily drawn to scale, and which show different views of different example embodiments, and wherein:

FIG. 1 conceptually illustrates a freight quoting process for a registered user to obtain a freight quote in some embodiments.

Figure 2:
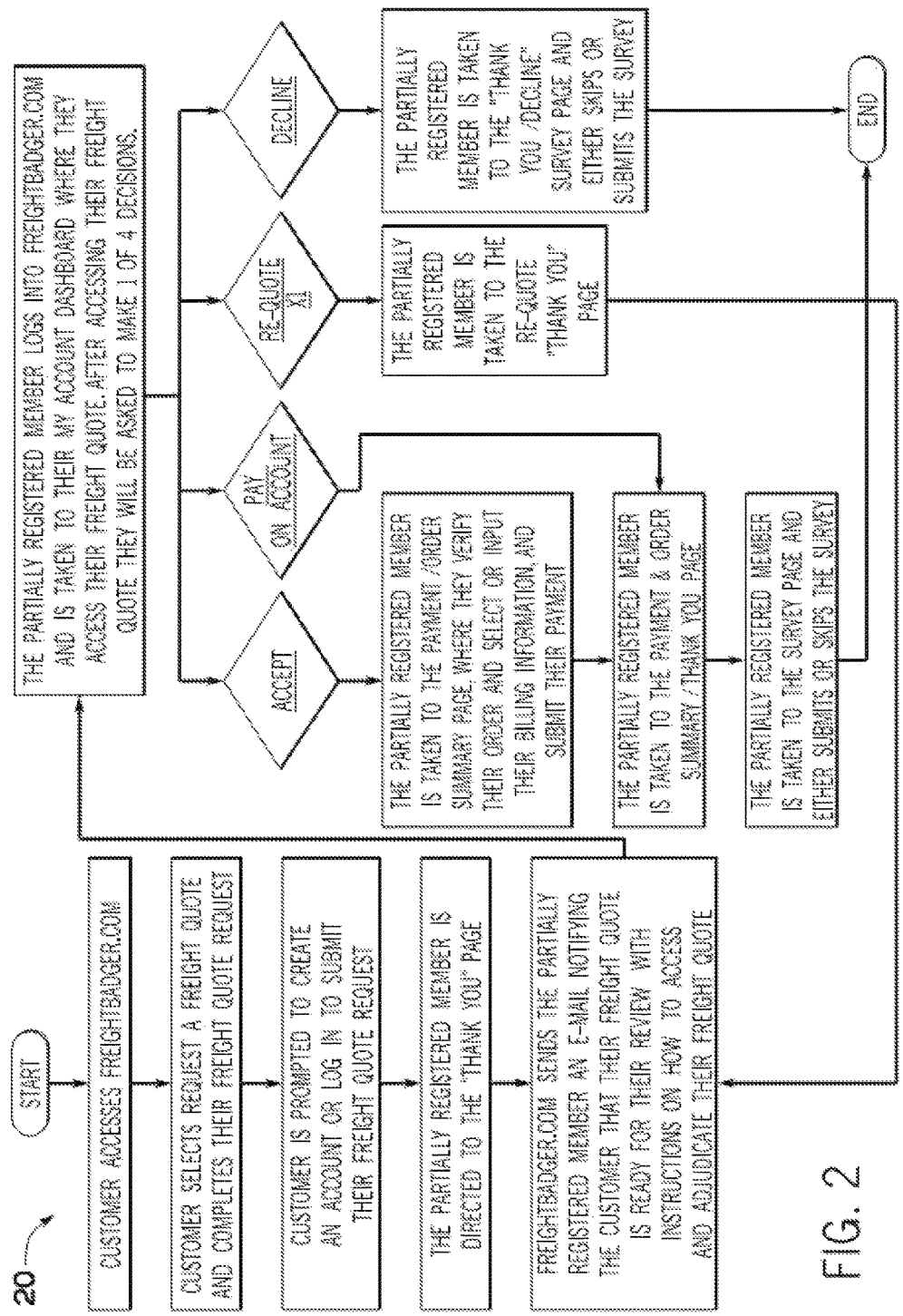

FIG. 2 conceptually illustrates another freight quoting process for a non-registered user or partially-registered user to obtain a freight quote in some embodiments.

Figure 3:
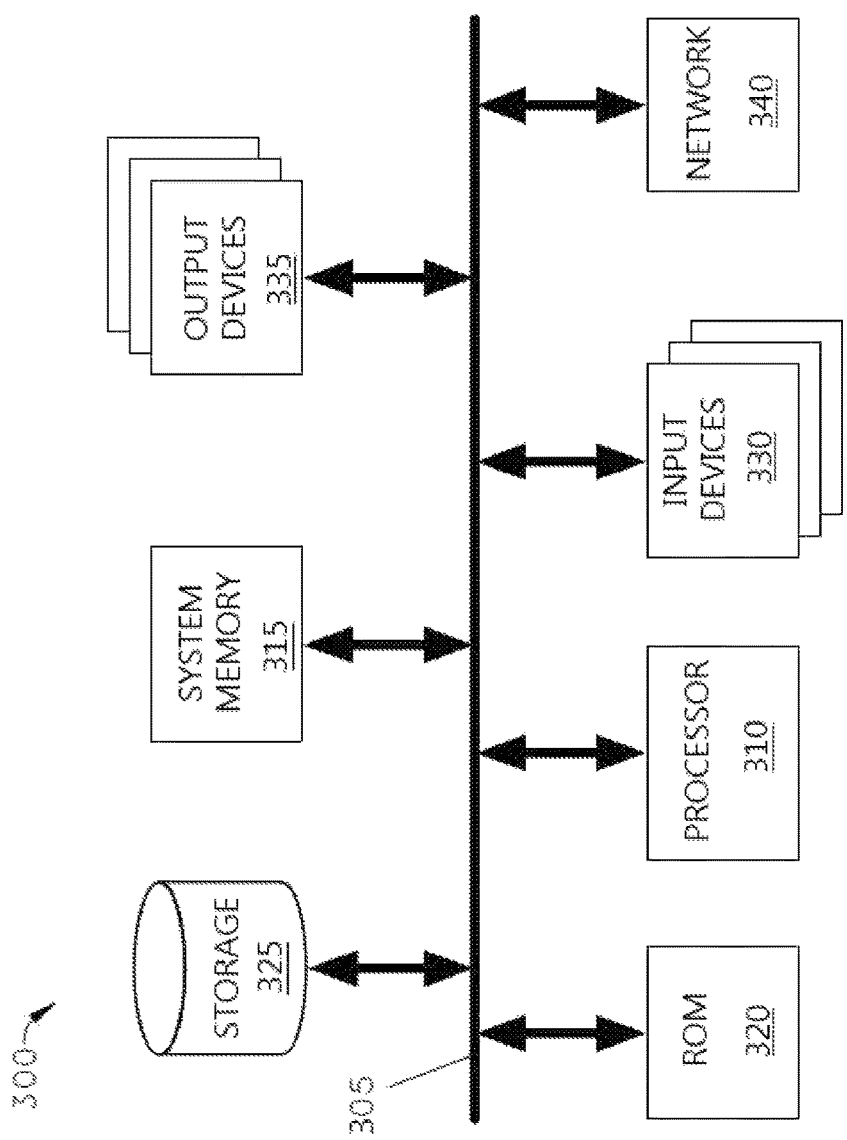

FIG. 3 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several needs.

I. Freight Quoting Processes

Some embodiments of the invention include novel freight quoting processes for obtaining a freight quote for delivery of a freight quote item and automatically informing a freight company about a customer satisfaction level related to a quoted price for a customer-selected freight delivery. In some embodiments, the freight quoting processes include a freight company quoting process and a freight customer quoting process.

In some embodiments, the freight company quoting process (i) receives a set of user credentials for accessing a customer account, (ii) receives a request for a freight quote, (iii) transmits a freight quote to a confirmed communication account of the customer, and (iv) receives a selection of a decision from a plurality of decisions associated with the freight quote item. The freight company quoting process can be performed in relation to a registered user associated with an existing customer account or a non-registered or partially-registered user not associated with an existing customer account.

In some embodiments, the plurality of decisions comprises a decision to accept the freight quote, a decision to decline the freight quote, and a decision to request a re-quote of the freight quote. In some embodiments, the freight quoting process further comprises transmitting a re-quoted freight price to the confirmed communication account of the customer. In some embodiments, the confirmed communication account of the customer is at least one of an email address, an SMS number, and a telephone number. In some embodiments, the freight company quoting process is performed by a freight company quoting program that runs on a computing device that is connected to a network.

In some embodiments, the freight customer quoting process (i) receives a set of user inputs for accessing a customer account associated with a freight company, (ii) transmits the set of user inputs to log into the customer account, (iii) transmits a set of freight quote request inputs of the user in order to obtain a quote from the freight company, (iv) receives a notification informing the user to retrieve a quote from a confirmed communication account of the user, and (v) transmits a user-selected decision associated with the quote to the freight company. The freight customer quoting process can be performed in relation to a registered user associated with an existing customer account or a non-registered or partially-registered user not associated with an existing customer account. In some embodiments, the freight customer quoting process is performed by freight customer quoting program that runs on a computing device that is connected to the network.

In some embodiments, the freight quoting process receives the set of user credentials for accessing the customer account when the customer wants to log onto the freight company's system to request a freight quote. In some embodiments, once a customer logs into and accesses their account, the customer can select a freight quote that they would like to make a decision on.

In some embodiments, the customer logs into their account via a website portal (e.g., a freight quoting portal, such as FreightBadger.com). In order to incorporate the freight quoting process into a website, previously non-existent items are required that automate interactions associated with the customer's decision cycle (e.g., after receiving a quote, the customer needs to accept, decline, or do something else, such as request a re-quote). In some embodiments, the customer is able to use one or more graphical user interface (GUI) tools to facilitate the decision cycle. For example, a "Re-Quote" GUI button lets the customer to request a re-quoted freight price.

In some embodiments, the customer gets redirected to the decision page, where they can either Accept the Quote, Decline the Quote or request a Re-Quote of the Quote. In some embodiments, the customer is limited in the number of requests for re-quote that can be made. For example, the number of permissible re-quote requests can be limited by limiting the number of times a customer can select the Re-Quote Button through the administration side.

If the Customer decides to Decline the Quote, the Quote will be archived for 24 hours for their convenience. Currently, we have decided to restrict the Re-Quote option to a single submission, meaning that after someone receives a first Re-Quote they will no longer have the option of selecting the Re-Quote button and the only options that they will have are to Accept or Decline the Freight Quote. This is the same for a Customer who re-accesses a Freight Quote that they have Declined within the 24-hour window.

II. Registered Customer Freight Quoting Process

By way of example, FIG. 1 conceptually illustrates a freight quoting process 10 for a registered user to obtain a freight quote in some embodiments. As shown in this figure, the freight quoting process 10 starts when a customer accesses a freight quoting portal (e.g., freightbadger.com). The customer logs into an existing account, in which case the freight quoting process 10 redirects to an account dashboard page associated with the customer's existing account. The process 10 then accepts a selection of a request for a freight quote. For example, the customer may interface with the dashboard page using a client computing device that is connected to and logged into the freight quoting portal (e.g., freightbadger.com) to make such a request. Upon entering all of the needed freight quote information, the process 10 next submits the freight quote request. In some embodiments, the process 10 then directs the customer to a "thank you" page.

The freight quoting process 10 of some embodiments then sends the registered customer a communication indicating that the freight quote is ready to be reviewed. For example, the process 10 can send an email message to a confirmed email address of the customer, a text message to a confirmed SMS number of the customer, or a voice message to a confirmed telephone number of the customer. Sometime after receiving the communication, the customer again accesses the freight quote portal (e.g., freightbadger.com) and logs into the customer account to access the freight quote noted in the communication. The freight quoting process 10 then determines whether the customer has made a decision with respect to the freight quote. In some embodiments, the customer can accept the freight quote, pay on an existing account, request a re-quote, or decline the freight quote.

When the customer accepts the freight quote, the freight quoting process 10 redirects to a payment/order summary page. From the payment/order summary page, the customer may verify the order of the freight quote item, verify the freight quote amount and details, enter (or select) payment or billing information, and then submit the order transaction for payment. The freight quoting process 10 then redirects to a payment/order summary and thank you page. In some embodiments, the freight quoting process 10 then redirects to a survey page for the customer to enter (or skip) a set of responses to survey questions. The freight quoting process 10 then ends.

Turning back to the point at which the freight quoting process 10 determines whether the customer has made a decision with respect to the freight quote, when the customer pays the freight quote from an existing account, the freight quoting process 10 skips the redirection to the payment/order summary page and instead redirects to the payment/order summary and thank you page. Then the freight quoting process 10 redirects to the survey page, which the customer can complete or skip. The freight quoting process 10 then ends.

Turning back to the point at which the freight quoting process 10 determines whether the customer has made a decision with respect to the freight quote, when the customer requests a re-quote, the freight quoting process 10 redirects to a "re-quote thank you" page. In some embodiments, the customer may wish to receive a new quote and, therefore, will request a re-quote. Thus, the freight quoting process 10 of some embodiments then returns to the step (described above) in which the process 10 sends a communication to the customer with the freight re-quote.

Turning back to the point at which the freight quoting process 10 determines whether the customer has made a decision with respect to the freight quote, when the customer declines the freight quote, the freight quoting process 10 then redirects to a thank you/decline survey page, which the customer may complete or skip. The freight quoting process 10 then ends.

III. Partially Registered Customer Freight Quoting Process

Turning to another example, FIG. 2 conceptually illustrates another freight quoting process 20 for a non-registered user or partially-registered user to obtain a freight quote in some embodiments. As shown in this figure, the freight quoting process 20 starts when a customer accesses a freight quoting portal (e.g., freightbadger.com). In this process 20, the customer selects an option to request a freight quote and enters information necessary to make a quote.

At this point, the freight quoting process 20 recognizes that the freight request was entered by a user who is either (i) not registered with a customer account or (ii) not logged into the freight quoting portal. Thus, the freight quoting process 20 prompts the user to create a customer account or log into the portal with registered customer account credentials. When the user is associated with an existing customer account, and logs into the portal with the proper customer credentials, the freight quoting process 20 transitions to the customer dashboard and proceeds from that point, as described above by reference to FIG. 1.

On the other hand, when the user is not associated with an existing customer account, the user begins to register on the freight quoting portal. Next, the freight quoting process 20 transitions to the "Thank you" page for the partially registered user. The freight quoting process 20 of some embodiments then sends the partially registered user a communication indicating that the freight quote is ready to be reviewed and adjudicated. The freight quoting process 20 can send the communication in any of several well-known formats, including an email message to an email address of the partially registered user, a text message to an SMS number of the partially registered user, or a voice message to a telephone number of the partially registered user.

Sometime after receiving the communication, the partially registered user again accesses the freight quote portal (e.g., freightbadger.com) and logs into the customer account to access the freight quote noted in the communication. The freight quoting process 20 then determines whether the partially registered user has made a decision with respect to the freight quote. In some embodiments, the partially registered user can accept the freight quote, pay on an existing account, request a re-quote, or decline the freight quote.

When the partially registered user accepts the freight quote, the freight quoting process 20 redirects to a payment/order summary page. From the payment/order summary page, the partially registered user may verify the order of the freight quote item, verify the freight quote amount and details, enter (or select) payment or billing information, and then submit the order transaction for payment. The freight quoting process 20 then redirects to a payment/order summary and thank you page for the partially registered user. In some embodiments, the freight quoting process 20 then redirects to a survey page for the partially registered user to enter (or skip) a set of responses to survey questions. The freight quoting process 20 then ends.

Turning back to the point at which the freight quoting process 20 determines whether the partially registered user has made a decision with respect to the freight quote, when the partially registered user pays the freight quote from an existing account, the freight quoting process 20 redirects to the payment/order summary and thank you page for the partially registered user. The freight quoting process 20 then redirects to the survey page, which the partially registered user can complete or skip. The freight quoting process 20 then ends.

Turning back to the point at which the freight quoting process 20 determines whether the partially registered user has made a decision with respect to the freight quote, when the partially registered user requests a re-quote, the freight quoting process 20 redirects to a "re-quote thank you" page. In some embodiments, the partially registered user may wish to receive a new quote and, therefore, will request a re-quote. Thus, the freight quoting process 20 of some embodiments then returns to the step (described above) in which the freight quoting process 20 sends a communication to the partially registered user with the freight re-quote.

Turning back to the point at which the freight quoting process 20 determines whether the partially registered user has made a decision with respect to the freight quote, when the partially registered user declines the freight quote, the freight quoting process 20 then redirects to a thank you/decline survey page, which the partially registered user may complete or skip. The freight quoting process 20 then ends.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 3 conceptually illustrates an electronic system 300 with which some embodiments of the invention are implemented. The electronic system 300 may be a computing device, such as a desktop computer, a laptop computer, a tablet computing device, a portable hand-held computing device, a portable communications devices (such as a mobile phone), a personal digital assistant (PDA) computing device, or any other sort of electronic device. Such an electronic system includes various types of computer readable media and interfaces for various other types of computer readable media. Electronic system 300 includes a bus 305, processing unit(s) 310, a system memory 315, a read-only 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only 320. For example, the various memory units include instructions for processing appearance alterations of displayable characters in accordance with some embodiments. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as cathode ray tubes (CRT) or liquid crystal displays (LCD). Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an Intranet), or a network of networks (such as the Internet). Any or all components of electronic system 300 may be used in conjunction with the invention.

The functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-2 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a freight quoting application which, when executed by at least one processing unit of a web server computing device, automates interactions associated with a freight quote decision cycle of a customer, the freight quoting application comprising sets of instructions for:

receiving, at the web server computing device, a request for a freight quote from a customer computing device;

setting an administration side freight quote request limit of two;

determining whether the received freight quote request is a first freight quote request that is less than the administration side freight quote request limit;

transmitting a freight quote, in response to a determination that the received freight quote request is the first freight quote request, by the web server computing device, to a communication account of the customer;

visually outputting the freight quote to a display screen of the customer computing device when the customer views the communication account via the customer computing device;

redirecting the display screen of the customer computing device to a decision page that includes a plurality of decisions that are selectable by the customer to provide greater customer control over freight quoting engagement options, said plurality of decisions comprising a decision to accept the freight quote, a decision to decline the freight quote, a decision to request a re-quote of the freight quote based on the determination that the received freight quote request is the first freight quote request and the administration side freight quote request limit is two, and a decision to make payment for the freight quote from an existing account;

receiving, by the web server computing device, a selection of a decision, made by the customer interacting with the decision page via the customer computing device, said decision selected from among the plurality of decisions associated with the freight quote item;

identifying, by the web server computing device, the received selection as a first decision;

visually outputting an order payment summary page on the display screen of the customer computing device when the first decision is to accept the freight quote, said order payment summary page comprising an order verification and payment GUI tool which the customer interacts with via the customer computing device to make a freight payment for the order at the accepted freight quote price;

receiving, by the web server computing device when the first decision is to accept the freight quote, the freight payment from the customer computing device for the order based on the accepted freight quote price;

visually outputting an order confirmation page on the display screen of the customer computing device when the first decision is to accept the freight quote;

generating, at the web server computing device, a second freight quote when the first decision is to request a freight re-quote based on a determination that the requested freight re-quote is a second freight quote request which does not exceed the administration side freight quote request limit of two;

removing, by the web server computing device, the decision to request a re-quote of the freight quote from the plurality of decisions included in the decision page based on a determination that the second freight quote request is equal to the administration side freight quote request limit of two;

updating the decision page, by the web server computing device, to include the plurality of decisions after removing the decision to request a re-quote of the freight quote;

transmitting, in response to the second freight quote request by the web server computing device, the second freight quote to the communication account of the customer;

visually outputting the second freight quote to the display screen of the customer computing device when the customer views the communication account with the second freight quote via the customer computing device;

redirecting the display screen of the customer computing device to the updated decision page after the customer views the communication account with the second freight quote via the customer computing device, wherein a decision to accept the second freight quote, a decision to decline the second freight quote, and a decision to make payment for the second freight quote from an existing account are included in the updated decision page, wherein the decision to request a re-quote is not included in the updated decision page;

receiving, by the web server computing device, a second decision in relation to the second freight quote when the first decision was to request a freight re-quote, wherein the second decision comprises one of the decision to accept the second freight quote, the decision to decline the second freight quote, and the decision to make payment for the second freight quote from the existing account;

redirecting the display screen of the customer computing device to a survey page, wherein a set of freight quoting survey questions is visually output to the display screen of the customer computing device to provide the customer an opportunity to affect improvements with the freight quoting process; and receiving, by the web server computing device, a survey selection from the customer computing device, said survey selection comprising one of a selection to complete the freight quoting survey questions and a selection to skip the freight quoting survey questions.

2. The non-transitory computer readable medium of claim 1, wherein the freight quoting application further comprises sets of instructions for:

determining whether the freight quote request is received from a registered customer based on customer credentials entered by the customer via the customer computing device when accessing a login page of the web server computing device;

when the freight quote request is received from a registered customer, visually outputting a freight quoting dashboard on the display screen of the customer computing device, said freight quoting dashboard specifically associated with the registered customer; and when the freight quote request is received from a non-registered user, visually outputting a freight quoting portal registration page on the display screen of the customer computing device.

3. The non-transitory computer readable medium of claim 2, wherein the freight quoting dashboard associated with the registered customer comprises a set of graphical user interface (GUI) tools which the customer interacts with via the customer computing device to review and adjudicate a freight quote.

4. The non-transitory computer readable medium of claim 3, wherein the GUI tools to adjudicate the freight quote comprise a freight quote acceptance GUI tool which the customer interacts with via the customer computing device to accept one of the freight quote and the second freight quote, a freight quote account payment GUI tool which the customer interacts with via the customer computing device to make a payment on one of the freight quote and the second freight quote, a freight quote decline GUI tool which the customer interacts with via the customer computing device to decline one of the freight quote and the second freight quote, and a freight re-quote GUI tool which the customer interacts with via the customer computing device to transmit a request for a re-quote when the first decision is for the first freight quote request, wherein the freight quoting dashboard is updated after the second freight quote request so that the customer cannot interact with the freight re-quote GUI tool to transmit requests for re-quotes after the second freight quote request.

5. The non-transitory computer readable medium of claim 1, wherein the communication account of the customer is a confirmed communication account which the customer computing device accesses upon verified authentication of the customer in part by customer credentials entered by the customer via the customer computing device when accessing a login page of the web server computing device and in part by at least one of an email address of the customer, a mobile device used for SMS messages, and a telephone number.

6. The non-transitory computer readable medium of claim 1, wherein the communication account of the customer is one of an email address, an SMS address, and a telephone number.

7. The non-transitory computer readable medium of claim 1, wherein the survey selection comprises the selection to skip the freight quoting survey questions.

8. The non-transitory computer readable medium of claim 1, wherein the survey selection comprises the selection to complete the freight quoting survey questions.

9. The non-transitory computer readable medium of claim 1, wherein the freight quoting application further comprises sets of instructions for:

receiving, by the web server computing device when the first decision is to decline the freight quote, a selection to review the declined freight quote, made by the customer interacting with the customer computing device;

determining, by the web server computing device, whether the selection to review the declined freight quote is received within twenty-four hours of the selection of the first decision to decline the freight quote;

visually outputting the declined freight quote, the decision to accept the freight quote, and the decision to decline the freight quote on the display screen of the customer computing device when the selection to review the declined freight quote is received within twenty-four hours of the selection of the first decision to decline the freight quote; and visually outputting only the declined freight quote on the display screen of the customer computing device when the selection to review the declined freight quote is received after twenty-four hours of the selection of the first decision to decline the freight quote.

* * * * *